(12) United States Patent
Meng et al.

(10) Patent No.: US 8,192,650 B2
(45) Date of Patent: Jun. 5, 2012

(54) METHOD FOR MANUFACTURING CARBON NANOTUBE-CONDUCTING POLYMER COMPOSITE

(75) Inventors: Chui-Zhou Meng, Beijing (CN); Chang-Hong Liu, Beijing (CN); Shou-Shan Fan, Beijing (CN)

(73) Assignees: Tsinghua University, Beijing (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 170 days.

(21) Appl. No.: 12/487,291

(22) Filed: Jun. 18, 2009

(65) Prior Publication Data

US 2010/0044647 A1 Feb. 25, 2010

(30) Foreign Application Priority Data

Aug. 22, 2008 (CN) .......................... 2008 1 0142022

(51) Int. Cl.
*H01B 1/04* (2006.01)
*H01B 1/12* (2006.01)

(52) U.S. Cl. ...... 252/511; 252/510; 427/96.1; 427/96.4; 427/58

(58) Field of Classification Search .................. 252/511, 252/510; 427/96.1, 96.4, 58
See application file for complete search history.

(56) References Cited

U.S. PATENT DOCUMENTS

| | | | |
|---|---|---|---|
| 6,599,446 B1 * | 7/2003 | Todt et al. ....................... | 252/511 |
| 6,800,155 B2 | 10/2004 | Senecal et al. | |
| 6,936,653 B2 * | 8/2005 | McElrath et al. .............. | 524/496 |
| 6,949,159 B2 * | 9/2005 | Friend et al. ................... | 156/242 |
| 6,991,750 B2 | 1/2006 | Majumdar et al. | |
| 7,001,556 B1 * | 2/2006 | Shambaugh ............... | 264/210.6 |
| 7,008,563 B2 * | 3/2006 | Smalley et al. ............... | 252/511 |
| 7,022,776 B2 | 4/2006 | Bastiaens et al. | |
| 7,118,693 B2 * | 10/2006 | Glatkowski et al. .......... | 252/502 |
| 7,153,903 B1 | 12/2006 | Barraza et al. | |
| 7,455,793 B2 | 11/2008 | Hsu et al. | |
| 7,462,656 B2 * | 12/2008 | Keulen et al. .................. | 523/351 |
| 7,479,516 B2 | 1/2009 | Chen et al. | |
| 7,960,037 B2 | 6/2011 | Liu et al. | |
| 7,972,537 B2 * | 7/2011 | Meng et al. .................... | 252/511 |
| 2006/0118768 A1 | 6/2006 | Liu et al. | |
| 2007/0104947 A1 * | 5/2007 | Shambaugh .................. | 428/359 |
| 2008/0145570 A1 | 6/2008 | Zhang et al. | |
| 2009/0053512 A1 | 2/2009 | Pyun et al. | |
| 2009/0181239 A1 * | 7/2009 | Fan et al. ....................... | 428/327 |
| 2010/0019209 A1 * | 1/2010 | Meng et al. .................... | 252/511 |
| 2010/0051471 A1 * | 3/2010 | Meng et al. .................... | 205/414 |
| 2010/0104808 A1 | 4/2010 | Fan et al. | |
| 2010/0127241 A1 | 5/2010 | Gruner et al. | |
| 2011/0023955 A1 | 2/2011 | Fonash et al. | |

FOREIGN PATENT DOCUMENTS

| | | |
|---|---|---|
| CN | 101003909 | 7/2007 |
| CN | 101009222 | 8/2007 |
| CN | 101121791 | 2/2008 |

OTHER PUBLICATIONS

Peng et al., "A comparative study on electrochemical co-deposition and capacitance of composite films of conducting polymers and carbon nanotubes", Electrochimica Acta, 53 (2007), 525-537.*
Downs et al., "Efficient Polymerization of Aniline at Carbon Nanotube Electrodes", Adv. Mater., 1999, 11 (12), 1028-1031.*
Ferrer-Anglada et al., "Transparent and flexible carbon nanotube'polypyrrole and carbon nanotube/polyaniline pH sensors", Phys. Stat. Sol. (b), 243(13), 3519-3523 (2006).*
Lin et al., "Electrosynthesis, characterization, and application of novel hybrid materials based on carbon nanotube-polyaniline-nickel hexacyanoferrate nanocomposites", J. Mater. Chem., 2006, 16, 585-592.*
Manesh et al., "Electrocatalytic Dioxygen Reduction at Glassy Carbon Electrode Modified with Polyaniline Grafted Multiwall Carbon Nanotube", Electroanalysis, 2006, 18(16), 1564-1571.*
Chen et al, Electrochemical Preparation and Characterization of Carbon Nanotube/nanocrystalline TiO2-Polyaniline Complex Film Electrode, Journal of Jilin University (Science Edition), Mar. 2007, P288-P292, vol. 45, No. 2, Changchun, China.
Xia et al., "Polymer-Encapsulated Carbon Nanotubes prepared through Ultrasonically Initiated In Situ Emulsion Polymerization", Chem. Mater., 15, 3879-3886 (2003).
Talbi et al., "Electropolymerization of aniline on carbonized polyacrylonitrile aerogel electrodes: applications for supercapacitors", Journal of Applied Electrochemistry, 33, 465-473 (2003).
Santos et al., "Electrografting Polyaniline on Carbon through the Electroreduction of Diazonium Salts and the Electrochemical Polymerization of Aniline", J. Phys. Chem. C, 112 (2008), 16103-16109.
Deng et al., "Polyaniline deposition to enhance the specific capacitance of carbon nanotubes for supercapacitors", Journal of Materials Science Letters, 40(18), 5021-5023 (2005).
Park et al., "Dispersion of single wall carbon nanotubes by in situ polymerization under sonication", Chemical Physics Letters, 364 (2002), 303-308.
Wang et al., "Electropolymerization and catalysis of well-dispersed polyaniline/carbon nanotube/gold composite", Journal of Electroanalytical Chemistry, 599 (2007), 121-126.

* cited by examiner

*Primary Examiner* — Douglas McGinty
(74) *Attorney, Agent, or Firm* — Altis Law Group, Inc.

(57) ABSTRACT

A method for manufacturing a conducting polymer composite with carbon nanotubes is described. A conducting polymer is compounded with the CNT film by in-situ chemical polymerization.

19 Claims, 2 Drawing Sheets

METHOD FOR MANUFACTURING CARBON NANOTUBE-CONDUCTING POLYMER COMPOSITE

RELATED APPLICATIONS

This application is related to applications entitled, "CARBON NANOTUBE-CONDUCTING POLYMER COMPOSITE", U.S. patent application Ser. No. 12/317,147, filed Dec. 19, 2008, now U.S. Pat. No. 7,972,537; "METHOD FOR MANUFACTURING CARBON NANOTUBE-CONDUCTING POLYMER COMPOSITE", U.S. patent application Ser. No. 12/487,284, filed Jun. 18, 2009. The disclosures of the above-identified applications are incorporated herein by reference.

BACKGROUND

1. Technical Field

The disclosure relates to a carbon nanotube-polymer composite, and particularly to a method for making carbon nanotube-conducting polymer composite.

2. Description of Related Art

Carbon nanotubes (CNTs) have a high Young's modulus, high thermal conductivity, and high electrical conductivity, among other properties, making them an ideal composite material supplement. A composite material having CNTs as reinforcement and electrical conductor has broad applications such as microelectronics, material science, biology, and chemistry because of good anti-static performance, microwave absorbing capability, electromagnetic shielding ability, and so on.

The conventional carbon nanotube-conducting polymer composite includes a plurality of CNTs with conducting polymer pellets distributed in the gaps among the CNTs. The carbon nanotube-conducting polymer composite is applicable in the field of super capacitors and in solar cell electrodes, in which charging and discharging of the conducting polymer pellets contract and expand conducting polymer pellet's volume. The spatial structures of CNTs may alleviate the volume contraction and expansion of the carbon nanotube-conducting polymer composite caused by the mentioned volume contraction and expansion of the conducting polymer pellet. Moreover, the carbon nanotube-conducting polymer composite's high electrical conductivity may reduce the resistance of the carbon nanotube-conducting polymer composite. Therefore, the carbon nanotube-conducting polymer composite provides favorable electrical conductivity and high specific electric capacity (exceeding 200 Farad/grams). However, in conventional technology, CNTs of the carbon nanotube-conducting polymer composite require dispersal in strong oxidized acid, such as sulfuric or nitric acid and surfactant, followed by electrochemical reaction with the conducting polymer pellets, with the result that carbon nanotube-conducting polymer composite film is finally obtained on the working electrode. Additionally, since the surfactant is not easily removed from the carbon nanotube-conducting polymer composite, performance of the carbon nanotube-conducting polymer composite is negatively affected. Moreover, because CNTs are easy to reunite, in the conventional technology, the CNTs cannot form a good electric conducting network. Considerable spacing between adjacent CNTs increases resistance of the carbon nanotube-conducting polymer composite and decreases specific electric capacity thereof, adversely affecting electrical conductivity and heat conduction of the CNTs.

What is needed, therefore, is a method for manufacturing a carbon nanotube-conducting polymer composite with CNTs uniformly dispersed in the carbon nanotube-conducting polymer composite and without damaging the CNTs in the process.

BRIEF DESCRIPTION OF THE DRAWINGS

Many aspects of the present carbon nanotube-conducting polymer composite can be better understood with reference to the following drawings. The components in the drawings are not necessarily drawn to scale, the emphasis instead being placed upon clearly illustrating the principles of the present carbon nanotube-conducting polymer composite.

Figure 1:
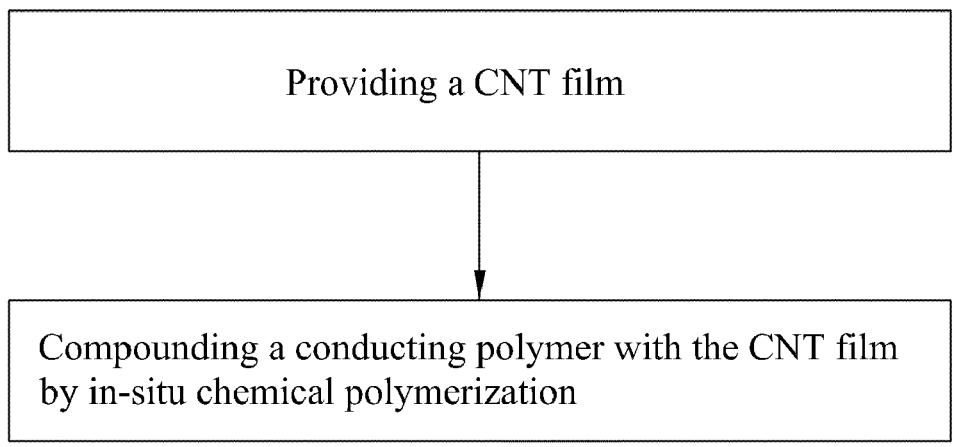
FIG. 1 is a flow chart of a method for manufacturing a carbon nanotube-conducting polymer composite in accordance with an embodiment.

Corresponding reference characters indicate corresponding parts throughout the several views. The exemplifications set out herein illustrate at least one embodiment of the present carbon nanotube-conducting polymer composite, in one form, and such exemplifications are not to be construed as limiting the scope of the invention in any manner.

DETAILED DESCRIPTION

References will now be made to the drawings to describe, in detail, the present method for manufacturing a carbon nanotube-conducting polymer composite.

Referring to FIG. 1, a method for preparing a carbon nanotube-conducting polymer composite includes the following steps of: (1) providing a CNT film; (2) compounding a conducting polymer with the CNT film by in-situ chemical polymerization.

In step (1), the CNT film can be a grown CNT film, a flocculated CNT film, a pressed CNT film, or drawn CNT film. In one embodiment, the CNT film is the flocculated CNT film made by a flocculating method. The method of flocculating includes the following steps of: (1a) providing a plurality of CNTs; (1b) dispersing the CNTs into a solvent to obtain a CNT floccule structure; (1c) separating the CNT floccule structure from the solvent; and (1d) shaping the CNT floccule structure into a CNT floccule film.

In step (1a), a plurality of CNTs can be prepared in the present embodiment by the following steps of:

(1a1) providing a substantially flat and smooth silicon substrate with a diameter of four inches;

(1a2) forming a catalyst layer on the substrate;

(1a3) annealing the substrate with the catalyst layer in air;

(1a4) supplying a carbon source gas to grow an array of CNTs on the substrate; and (1a5) removing the array of CNTs from the substrate.

In step (1a1), the silicon substrate can be a P-type silicon wafer, an N-type silicon wafer or a silicon wafer formed with an oxidized layer thereon. In one embodiment, a 4-inch, P-type silicon wafer is used as the substrate.

In step (1a2), a catalyst layer is formed on the substrate, wherein the catalyst layer can be made of iron (Fe), cobalt (Co), nickel (Ni), and an alloy thereof.

In step (1a3), substrate with the catalyst layer is annealed in air at a temperature in a range from about 700° C. to about 900° C. for about 30 to 90 minutes.

In step (1a4), a carbon source gas is supplied at high temperature into a furnace for about 5 to 30 minutes thereby to grow an array of CNTs on the substrate, wherein the substrate is put in a furnace which is heated to a temperature of 400-740° C. and is filled with a protective gas. The carbon source gas can be a hydrocarbon gas, such as acetylene (C2H2). The protective gas can be made up of at least one of nitrogen (N2), argon (Ar), ammonia (NH3), and a noble gas. In the present embodiment, the protective gas is argon (Ar).

In step (1a5), the array of CNTs is scrapped from the substrate by a knife or other similar device to obtain the plurality of CNTs.

The CNTs grown are substantially perpendicular to the substrate. Moreover, the array of CNTs formed under the above conditions is essentially free of impurities such as carbonaceous or residual catalyst particles. The CNTs in the array are closely packed together by the van Der Waals attractive force.

The CNTs can be single-walled, double-walled, or multi-walled, or a combination thereof. Diameters of the single-walled CNTs are approximately from about 0.5 nanometers (nm) to about 50 nanometers (nm). Diameters of the double-walled CNTs are approximately from about 1.0 nm to about 50 nm. Diameters of the multi-walled CNTs are approximately from about 1.5 nm to about 50 nm. Lengths of CNTs are approximately from about 100 nm to about 10 millimeters (mm).

In step (1b), the solvent is selected from the group consisting of water and volatile organic solvent. After dispersing the CNTs into the solvent, a process of flocculating the CNTs is executed to obtain the CNT floccule structure. The process of flocculating the CNTs can be ultrasonically dispersing the CNTs or agitating the CNTs. In the present embodiment, ultrasonic dispersion is used to flocculate the solvent containing the CNTs for about 10 to about 30 minutes. Due to the CNTs in the solvent having a large specific surface area and the bundled CNTs having a strong van der Waals attractive force, the flocculated and bundled CNTs form a network structure (i.e., floccule structure).

In step (1c), the process of separating the CNT floccule structure from the solvent includes the following steps of: (1c1) pouring the solvent containing the CNTs through a filter paper in a funnel; thus (1c2) filtering out the solvent in the CNT floccule structure.

In step (1c2), a time of filtering can be selected according to practical demands. The CNT flocculate structure on the filter is bundled together, so as to form an irregular flocculate structure.

In step (1d), the process of shaping the CNT floccule structure into a CNT floccule film includes the following steps:

(1d1) putting the CNT floccule structure into a container (not shown), and spreading the CNT floccule structure to form a predetermined structure;

(1d2) pressing the spread CNT floccule structure with a certain pressure to yield a desirable shape; and (1d3) volatilizing the residual solvent in the CNT floccule structure.

It is to be understood that the size of the spread CNT floccule structure is used to control a thickness and a surface density of the CNT film. As such, the larger the area of the CNT floccule structure, the less the thickness and density of the CNT film. The thickness of the CNT film is in the approximate range from about 1 micron to about 2 millimeters.

Further, the step (1c) and step (1d) can be accomplished by a process (1e) of pumping and filtering the CNT floccule structure to obtain the CNT film. The process (1e) includes the following steps of:

(1e1) providing a microporous membrane and an air-pumping funnel;

(1e2) filtering out the solvent from the CNT floccule structure through the microporous membrane using the air-pumping funnel; and (1e3) air-pumping and drying the CNT floccule structure attached on the microporous membrane.

In step (1e1), the microporous membrane has a smooth surface. And the aperture/diameters of micropores in the membrane are about 0.22 microns. The pumping filtration can exert air pressure on the floccule structure, thus forming a uniform CNT film. Moreover, due to the microporous membrane having a smooth surface, the CNT film can, beneficially, be easily separated from the substrate.

Bundling of the CNTs in the CNT film provides strength to the CNT film. Therefore, the CNT film is, advantageously, easy to be folded and/or bent into arbitrary shapes without rupture.

The CNT film produced by the flocculating method has the following virtues: the CNTs are bundled together by van der Walls attractive force to form a network structure/floccule structure. Thus, the CNT film is very tough. Furthermore, the CNT film is very simply and efficiently produced by the method. A result of the production process of the method is that thickness and surface density of the CNT film are controllable.

It is to be understood that the CNT film can be a grown CNT film, a pressed CNT film, or a drawn CNT film. The grown CNT film is obtained by using chemical vapor deposition method to form a CNT film on a substrate. The CNTs of the grown CNT film are in disordered arrangement. The pressed CNT film is formed by pressing the array of CNTs using a compressing apparatus, thereby forming a pressed CNT film. The CNTs of the pressed CNT film are nearly all parallel to a surface of the pressed CNT film, and in one or many orientations according to successively oriented CNTs. A drawn CNT film is pulled out from the array of CNTs formed on a substrate. The pulling method comprises the steps of: selecting a predetermined width from the array of CNTs, and pulling the CNTs along a direction which is substantially perpendicular to the growing direction of the array of CNTs.

In step (2), compounding a conducting polymer with the CNT film by in-situ chemical polymerization, thereby obtaining a carbon nanotube-conducting polymer composite. The method of in-situ chemical polymerization includes the following steps of:

(2a) preparing a conducting polymer monomer acid solution in a container;

(2b) immersing the CNT film into the container, and cooling the container at temperature range of about 0 to about 5 for about 3 to 10 hours;

(2c) preparing an acid-oxidants solution; and (2d) dropping the acid-oxidants into the container, and compounding the conducting polymer monomers with the CNT film.

In step (2a), the conducting polymer monomer acid solution can be produced by dissolving a conducting polymer monomer in an acid solution. The conducting polymer monomer acid solution is placed in a container to be used as electrolyte. The conducting polymer monomer can be aniline, pyrrole, thiophene, acetylene, paraphenylene, poly phenylene vinylene, or any combination thereof. The acid solution can be hydrochloric acid, sulfuric, hydrogen nitrate, phosphoric, acetic, or any combination thereof.

In one embodiment, the conducting polymer monomer is aniline, the acid solution is sulfuric. The method of immersing the CNT film in the conducting polymer monomer acid solution comprises providing 40 milliliters (ml), 1 mol/L, sulfuric acid solution in a container, and putting 0.74504 grams of oil-like aniline monomer (0.74504 grams of oil-like aniline monomer was 0.008 mole) into the container. The oil-like aniline monomer is dissolved in the sulfuric acid solution and obtaining an aniline sulfuric acid solution with concentration is 0.2 mol/L. The aniline sulfuric acid solution is used as electrolyte to prepare a conducting polymer monomer not to disperse the CNTs.

In step (2b), immersing a CNT film into the container, and cooling the container at temperature of about 5° C. for 3 hours. The aniline monomer is uniform dispersed on the CNTs surface of the CNT film.

In step (2c), the method of preparing the acid-oxidants solution includes the following steps of: putting an oxidant in a vessel; pouring an acid solution in the vessel; and cooling the vessel at a temperature range of about 0° C. to about 5° C. for about 3 to about 10 hours. The oxidant can be selected from the group consisting of ammonium sulfate, potassium permanganate, and hydrogen peroxide. The acid solution can be selected from the group consisting of hydrochloric acid, sulfuric, hydrogen nitrate, phosphoric, acetic, and any combination thereof. The concentration ratio of the conducting polymer monomer acid solution and the acid-oxidants solution is in a range of about 0.5 to about 2.

In the present embodiment, the oxidant is ammonium sulfate, the acid solution is hydrochloric acid. The concentration ratio of the conducting polymer monomer acid solution and acid-oxidants solution is 1.

In one embodiment, the method of preparing the acid-oxidants solution includes the following steps of: providing 1.8256 grams of ammonium sulfate powder in a vessel; pouring 40 milliliters (ml), 1 mol/L, hydrochloric acid into the vessel; dissolving the ammonium sulfate powder in the hydrochloric acid, and obtaining 0.2 mol/L ammonium sulfate-hydrochloric acid. The ammonium sulfate powder can be sufficiently dissolved in the hydrochloric acid by putting the vessel at a temperature range of about 0° C. to about 5° C. for 3 hours.

In step (2d), the conducting polymer monomer is polymerized to conducting polymer fibers, thereby compounding the conducting polymer fibers with the CNT film to obtain the carbon nanotube-conducting polymer composite.

In one embodiment, the polymerization method includes placing the container in an ice water; slowly dripping acid-oxidants solution into the container such that the conductive polymer monomer in the container generate polymerization reaction to produce conductive polymer fibers; cooling the container at a temperature range of about 0° C. to about 5° C. for about 5 to about 20 hours. The container has conductive polymer monomer acid solution and the CNT film therein.

By cooling the conducting polymer monomer acid solution and acid-oxidants solution for about 5 to about 20 hours, the conductive polymer monomer becomes fully oxidized; thus the conductive polymer monomer is polymerized to the conductive polymer fibers. The conductive polymer fibers are adhered to the CNTs surfaces of the CNT film. The conducting polymer fibers connect with each other to form a conducting polymer fiber network. The conducting polymer fiber network adheres to the CNTs surfaces of the CNT film. Lengths of the conductive polymer fiber can be in a range of about 100 nm to about 10 mm, diameters of the conductive polymer fiber can be in a range of about 30 nm to about 120 nm. In one embodiment, the acid-oxidants solution, the conducting polymer monomer acid solution, and CNT film added together at a temperature range of about 0° C. to about 5° C. for 10 hours.

In the above-described steps, an additional step (3) of cleaning and baking the carbon nanotube-conducting polymer composite can be further provided after the step of dropping the acid-oxidants solution into the container. The step (3) includes the substeps of:

(3a) taking out the carbon nanotube-conducting polymer composite from the electrolyte;

(3b) removing the ion from the carbon nanotube-conducting polymer composite using deionized water;

(3c) putting the carbon nanotube-conducting polymer composite into a basin with an ethanol to remove the residual organic impurities; and (3d) placing the carbon nanotube-conducting polymer composite in a furnace at a temperature in about 80° C. for 4 hours. The ethanol on the carbon nanotube-conducting polymer composite is vaporized. In step (3), the ion and organic impurities will be removed from the carbon nanotube-conducting polymer composite.

Figure 2:
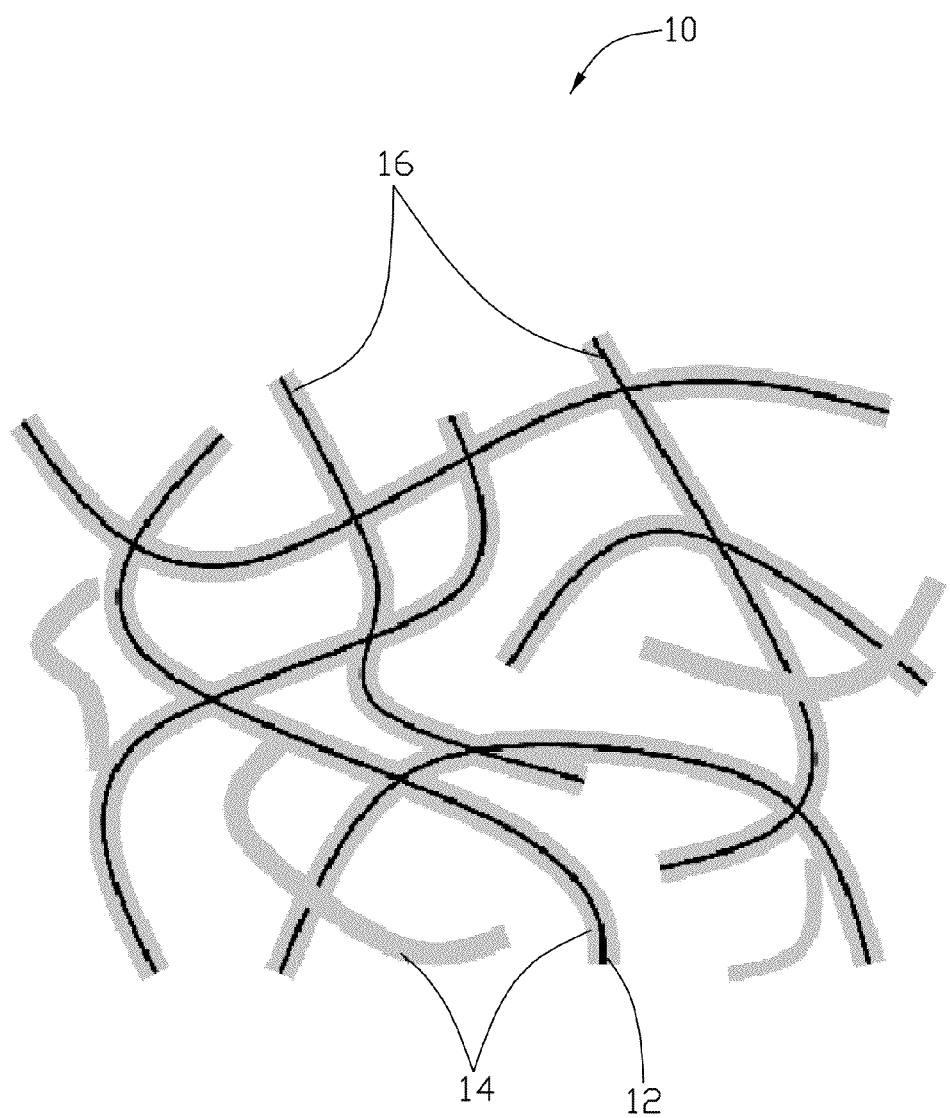
FIG. 2 is a schematic view of the carbon nanotube-conducting polymer composite of FIG. 1, wherein the carbon nanotube-conducting polymer includes disordered CNTs.

Referring to FIG. 2, a carbon nanotube-conducting polymer composite 10 includes a number of CNTs 12 and conducting polymer fibers 14. The CNTs 12 are connected to each other to form a CNT network 16. The conducting polymer fibers 14 adhere to surfaces of the CNTs 12. The CNT network 16 forms a skeleton to which the conducting polymer fibers 14 adhere. The CNTs 12 and conducting polymer fibers 14 are uniformly distributed in the carbon nanotube-conducting polymer composite 10.

Compared to conventional methods for manufacturing a carbon nanotube-conducting polymer composite, the methods of manufacturing a carbon nanotube-conducting polymer composite, describe herein can have the following advantages. The CNTs in the carbon nanotube film are connected with each other to form a carbon nanotube network, the conducting polymer fibers adhere to surfaces of the CNTs, the CNTs and conducting polymer fibers are uniformly distributed in the carbon nanotube-conducting polymer composite. As well, the methods require uncomplicated equipment, low cost and are suitable for mass production.

Finally, it is to be understood that the embodiments described are intended to illustrate rather than limit the invention. Variations may be made to the embodiments without departing from the spirit of the invention as claimed. The embodiments illustrate the scope of the invention but do not restrict the scope of the invention.

What is claimed is:

1. A method, the method comprising the steps of:
providing a carbon nanotube (CNT) film;
preparing a conducting polymer monomer acid solution in a container;
immersing the CNT film into the conducting polymer monomer acid solution in the container;
preparing an acid-oxidants solution; and
dropping the acid-oxidants solution into the container, and compounding conducting polymer monomers with the CNT film to form a carbon nanotube-conducting polymer composite.

2. The method as claimed in claim 1, wherein the CNT film is selected from the group consisting of a grown CNT film, a flocculated CNT film, a pressed CNT film, and a drawn CNT film.

3. The method as claimed in claim 1, wherein the CNT film is a flocculated CNT film, the flocculated CNT film is made by the steps of:
providing a plurality of CNTs;
adding the CNTs to a solvent to form the CNT floccule structure;
separating the CNT floccule structure from the solvent;

shaping the CNT floccule structure into a flocculated CNT film; and removing the residual solvent from the flocculated CNT film.

4. A method for making a carbon nanotube-conducting polymer composite, the method comprising the steps of:

providing a carbon nanotube (CNT) film;

preparing a conducting polymer monomer acid solution in a container;

immersing the CNT film into the conducting polymer monomer acid solution in the container;

preparing an acid-oxidants solution; and dropping the acid-oxidants into the container to oxidize conducting polymer monomer on the CNT film, wherein the conducting polymer monomer is polymerized to conducting polymer fibers, a concentration ratio of the conducting polymer monomer acid solution and acid-oxidants solution is about 1:2 to about 2:1.

5. The method as claimed in claim 1, wherein the conducting polymer monomer is oxidated on the CNT film, and the conducting polymer monomer is evenly polymerized to conducting polymer fibers.

6. The method as claimed in claim 5, wherein the conducting polymer fibers connect with each other to form a conducting polymer fibers network.

7. The method as claimed in claim 1, wherein the conducting polymer monomer acid solution is made by the following steps of:

providing a conducting polymer monomer;

preparing an acid solution;

dissolving the conducting polymer monomer in the conducting polymer monomer acid solution to obtain a conducting polymer monomer acid solution.

8. The method as claimed in claim 7, wherein the acid solution comprises a material selected from the group consisting of hydrochloric acid, sulfuric, hydrogen nitrate, phosphoric, acetic, and any alloy thereof.

9. The method as claimed in claim 1, wherein the step of immersing the CNT film into the conducting polymer monomer acid solution is carried out at a temperature range of about 0° C. to about 5° C. for about 3 to about 10 hours, the concentration of the conducting polymer monomer acid solution is about 0.1 to about 5 mol/L.

10. The method as claimed in claim 1, wherein the conducting polymer monomer is aniline.

11. The method as claimed in claim 1, wherein the acid-oxidants solution is made by the following steps of:

placing an oxidant in a vessel;

pouring about 0.1 to about 5 mol/L of acid solution in the vessel to get a mixture; and cooling the mixture at temperature of about 0° C. to about 5° C. for about 3 to about 10 hours.

12. The method as claimed in claim 1, wherein a concentration ratio of the conducting polymer monomer acid solution and acid-oxidants solution is about 1:2 to about 2:1.

13. The method as claimed in claim 1, wherein the acid-oxidants solution is supplied by dripping the acid-oxidants solution into the conducting polymer monomer acid solution having the CNT film immersed therein, the conductive polymer monomer generates polymerization reaction to produce conductive polymer fibers adhered to the CNTs surfaces of the CNT film.

14. The method as claimed in claim 13, wherein a length of the conducting polymer fiber is about 100 nanometers to about 10 millimeters, a diameter of the conducting polymer fiber is about 30 nanometers to about 120 nanometers.

15. The method as claimed in claim 1, further comprising a cleaning step after adding the acid-oxidants solution to the conducting polymer monomer acid solution of:

removing the carbon nanotube-conducting polymer composite from the mixture solution;

putting the carbon nanotube-conducting polymer composite into a deionized water;

eliminate the ions from the carbon nanotube-conducting polymer composite;

putting the carbon nanotube-conducting polymer composite into a container with an ethanol to remove the residual organic impurities; and placing the carbon nanotube-conducting polymer composite in a furnace at a temperature of about 80° C. for about 2 to about 6 hours.

16. The method as claimed in claim 1, wherein the conducting polymer monomer comprises a material selected from the group consisting of pyrrole, thiophene, acetylene, paraphenylene, poly phenylene vinylene, and any alloy thereof.

17. A method for making a carbon nanotube-conducting polymer composite, the method comprising the steps of:

providing a carbon nanotube (CNT) film;

preparing a conducting polymer monomer acid solution in a container;

immersing the CNT film into the conducting polymer monomer acid solution in the container;

preparing an acid-oxidants solution; and dropping the acid-oxidants solution into the container to oxidize conducting polymer monomer on the CNT film, wherein the conducting polymer monomer is polymerized to conducting polymer fibers by oxidization.

18. The method as claimed in claim 17, wherein the conducting polymer fibers are adhered to the CNTs surfaces of the CNT film.

19. The method as claimed in claim 4, wherein the acid-oxidants solution is made by the following steps of:

placing an oxidant in a vessel;

pouring about 0.1 to about 5 mol/L of acid solution in the vessel to obtain a mixture; and cooling the mixture at temperature of about 0° C. to about 5° C. for about 3 to about 10 hours.

* * * * *